July 25, 1967  D. R. BRUNSTETTER ET AL  3,333,083
METHOD OF WELDING STRANDED WIRE
Filed Dec. 27, 1963
FIG. 1
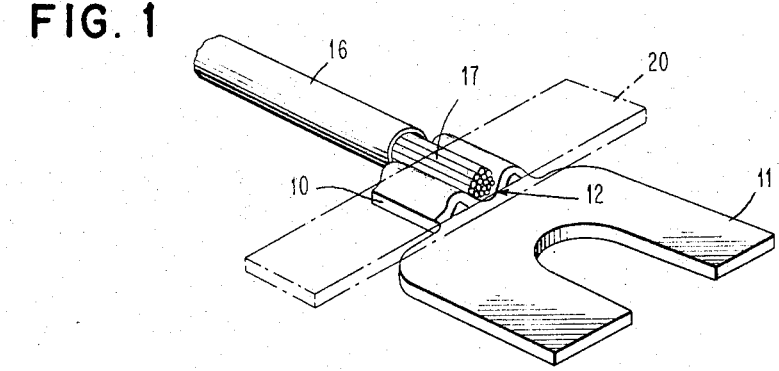
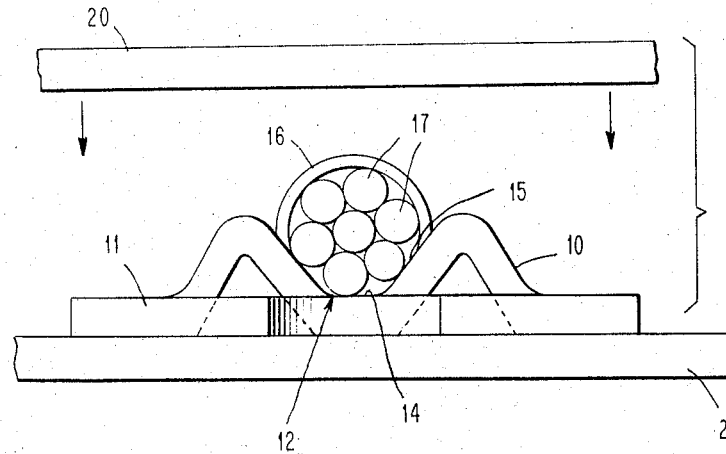
FIG. 2
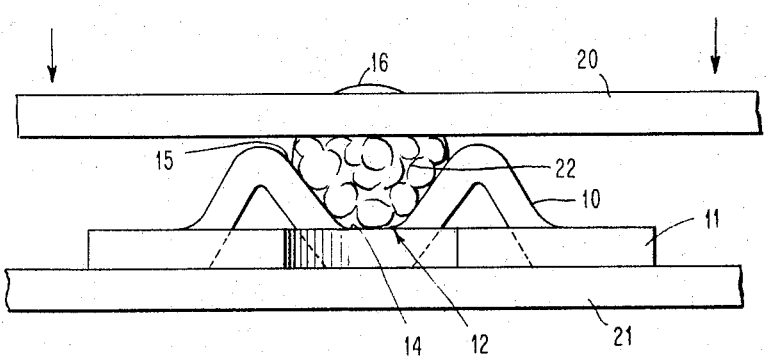
FIG. 3
INVENTORS
DONALD R. BRUNSTETTER
ADOLPH W. RZANT
BY John L. Sterling
ATTORNEY

United States Patent Office

3,333,083
Patented July 25, 1967

3,333,083
METHOD OF WELDING STRANDED WIRE
Donald R. Brunstetter, Hyde Park, and Adolph W. Rzant, Poughkeepsie, N.Y., assignors to International Business Machines Corporation, New York, N.Y., a corporation of New York
Filed Dec. 27, 1963, Ser. No. 333,864
3 Claims. (Cl. 219—117)

This invention relates to a method of welding and more particularly to a method of welding multistrand wire or cable to a component.

In welding braided, tinsel or multistrand wire to a component such as a contact connector or bus bar, many of the strands often fail to come within the field of heat from the electrode and thus are not welded to the remainder of the strands. In the present state of wiring of micro-miniature electronic circuits using low voltage this is a distinct disadvantage as it lowers the current carrying capacity of the wire. In effect it reduces the size of the wire or cable by a percentage equal to the number of strands not fused or joined in the weld.

It is the principal object of this invention to provide a method of welding a multistrand wire to a connector with an improved joint between the strands and the connector.

Another object is to provide such a method wherein the connector for welding formed by coining the metal into a preferred shape at the point of weld.

The foregoing and other objects, features and advantages of the invention will be apparent from the following more particular description of the preferred embodiment of the invention, as illustrated in the accompanying drawings.

In the drawings:

FIG. 1 is an isometric view of a connector to which a multistrand wire is to be welded.

FIG. 2 is a cross section taken along line 2—2 of FIG. 1 showing the wires prior to welding.

FIG. 3 is a cross section similar to FIG. 2 showing the wires welded to the connector.

In carrying out the invention the tongue 10 of a connector 11 is coined into two inverted V-shaped parallel ridges to provide an open U-shaped trough 12 having a flat bottom 14 and side walls 15. Prior to welding the insulation is stripped from the end of the wire 16 and the strands 17 are loosely nested in the trough 12. At this time the strands are nested at shown in FIG. 2. As the electrode 20 is lowered, the strands are confined by the base 14 and side walls 15 of the trough and forced together as further pressure is exerted. As current flows between electrodes 20 and 21 the high contact resistance between the strands causes them to heat and weld to each other to form a more or less homogeneous unit or wire 22 prior to welding to the walls of the groove 15. This insures that the sides of the trough will remain firm until near the end of the welding cycle when the unit is welded and has a minor part above the level of the ridges. At that time, the groove walls, together with the plating, will flow joining the wire in a fusion of the metals, as shown in FIG. 3.

A number of troughs of different configuration were tested and the open U configuration of that in FIG. 2 was found the most satisfactory. The side walls 15 of the trough are formed at an angle of between sixty to sixty-five degrees to the bottom or base 14. This angle was found to collect the strands 17 without jamming or forcing the upper stanrds out of place. The depth of the trough is determined by the gauge of the wire and is such that when the wire is plasticied it will fill the trough.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The method of welding an insulated multistrand wire to a connector comprised of:

providing a connector having a tongue which is formed into two parallel ridges having a trough between the ridges, said trough having a flat bottom and two inclined sides, stripping the insulation from an insulated multistrand wire to form a stripped end of strands, said stripped end having a diameter which is appreciably greater than the depth of the trough, positioning the stripped end of strands in said trough so that contact with the bottom and sides of the trough results and so that some strands are above the ridges, placing a bottom electrode in contact with the bottom of the trough and a top electrode in contact with the stripped end of strands which is above the ridges, and applying pressure and welding current between said electrodes so that said strands are gathered by the sides and bottom of the trough and welded into a homogeneous unit which is then welded to the sides and bottom of said trough.

2. The method of welding an insulated multistrand wire to a connector comprised of:

providing a connector having a tongue which is formed into two parallel ridges having a trough between the ridges, said trough having a flat bottom and two inclined sides, stripping the insulation from an insulated multistrand wire to form a stripped end of strands, said stripped end having a diameter which is appreciably greater than the depth of the trough, positioning the stripped end of strands in said trough so that contact with the bottom and sides of the trough results and so that some strands are above the ridges, placing a bottom electrode in contact with the bottom of the trough and a top electrode in contact with the stripped end of strands which is above the ridges, and applying pressure and welding current between said electrodes so that said strands are collected within the trough and welded together to give a unit which then is welded to the sides and bottom of the trough with a minor portion of the unit remaining above the level of the tops of the ridges.

3. The method of welding an insulated multistrand wire to a connector comprised of:

providing a connector having a tongue which is formed into two parallel inverted V-shaped ridges having a trough between the ridges, said trough having a flat bottom and two inclined sides which are at an angle of between sixty and sixty-five degrees to said bottom stripping the insulation from an insulated multistrand wire to form a a stripped end of strands, said stripped end having a diameter which is appreciably greater than the depth of the trough, positioning the stripped end of strands in said trough so that contact with the bottom and sides of the trough results and so that some strands are above the ridges, placing a bottom electrode in contact with the bottom of the trough and a top electrode traversely in contact with the stripped end of strands which is above the ridges, and applying pressure and welding current between said electrodes so that said strands are collected within the trough and welded together to give a unit which then is welded to the sides and bottom of the trough with a minor portion of the unit remaining above the level of the tops of the ridges.

References Cited
UNITED STATES PATENTS

| | | | |
|---|---|---|---|
| 2,711,466 | 6/1955 | Marx | 219—79 |
| 3,015,020 | 12/1961 | Long | 219—79 |

RICHARD M. WOOD, *Primary Examiner.*

B. A. STEIN, *Assistant Examiner.*